US010015562B2

(12) United States Patent
Moore et al.

(10) Patent No.: US 10,015,562 B2
(45) Date of Patent: *Jul. 3, 2018

(54) SYSTEM AND METHOD FOR METADATA-LINKED ADVERTISEMENTS

(71) Applicant: Rovi Guides, Inc., San Carlos, CA (US)

(72) Inventors: Sean S. Moore, Tulsa, OK (US); David M. Berezowski, Tulsa, OK (US); Todd A. Walker, Berwyn, PA (US); Michael D. Ellis, Boulder, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,479

(22) Filed: Oct. 10, 2014

(65) Prior Publication Data

US 2015/0128176 A1 May 7, 2015

Related U.S. Application Data

(63) Continuation of application No. 12/635,459, filed on Dec. 10, 2009, now Pat. No. 8,863,170, which is a (Continued)

(51) Int. Cl.
*H04N 7/025* (2006.01)
*H04N 21/81* (2011.01)
(Continued)

(52) U.S. Cl.
CPC .......... *H04N 21/812* (2013.01); *G06Q 30/02* (2013.01); *G06Q 30/0241* (2013.01);
(Continued)

(58) Field of Classification Search
CPC ............. H04N 21/812; H04N 21/4532; H04N 21/2553; H04N 21/2668
(Continued)

(56) References Cited

U.S. PATENT DOCUMENTS 3,440,427 A   4/1969 Kammer
3,492,577 A   1/1970 Reiter et al.
(Continued)

FOREIGN PATENT DOCUMENTS

AU   199856198   7/1998
AU   731010 B2   3/2001
(Continued)

OTHER PUBLICATIONS

"Enhanced Content Specification", "ATVEF", from the Internet at http://www.atvef.com/library/spec.html, printed Aug. 22, 2001, the document bears a Copyright date of 1998,1999, 2000.
(Continued)

*Primary Examiner* — Jivka Rabovianski
(74) *Attorney, Agent, or Firm* — Haley Guiliano LLP

(57) ABSTRACT

Systems and methods for providing metadata-selected advertisements are provided. These systems and methods may receive metadata and other media, select an object, read metadata attached to or associated with the selected object, select an advertisement based on the metadata, and display the selected advertisement. In addition, monitoring, collecting, and recording of predefined data concerning metadata selected advertisements may be provided. The invention also provides a receiver for receiving signals and/or data (e.g., programs, advertisements, program guides, metadata, etc.) and a processor for accepting a user=s input signal, selecting an object, reading metadata attached to or associated with a selected object, selecting an advertisement, and displaying the selected advertisement.

24 Claims, 7 Drawing Sheets

Related U.S. Application Data continuation of application No. 09/823,588, filed on Mar. 30, 2001, now abandoned.

(60) Provisional application No. 60/193,948, filed on Mar. 31, 2000.

(51) Int. Cl.
  *G06Q 30/02* (2012.01)
  *H04N 21/235* (2011.01)
  *H04N 21/2668* (2011.01)

(52) U.S. Cl.
  CPC ..... *G06Q 30/0251* (2013.01); *G06Q 30/0256* (2013.01); *H04N 21/2353* (2013.01); *H04N 21/2668* (2013.01)

(58) Field of Classification Search
  USPC ......... 725/32, 34, 35, 42, 87, 109, 110, 112, 725/131, 139
  See application file for complete search history.

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,189,781 A | 2/1980 | Douglas |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,403,285 A | 9/1983 | Kikuchi |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,859 A | 9/1986 | Rockley |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,729,027 A | 3/1988 | Hakamada et al. |
| 4,734,769 A | 3/1988 | Davis |
| 4,745,549 A | 5/1988 | Hashimoto |
| 4,746,983 A | 5/1988 | Hakamada |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,855,813 A | 8/1989 | Russell et al. |

(56) References Cited

U.S. PATENT DOCUMENTS

| | | |
|---|---|---|
| 4,857,999 A | 8/1989 | Welsh |
| 4,862,268 A | 8/1989 | Campbell et al. |
| 4,864,429 A | 9/1989 | Eigeldinger et al. |
| 4,873,584 A | 10/1989 | Hashimoto |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,168 A | 12/1989 | Inoue et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,918,531 A | 4/1990 | Johnson |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,954,882 A | 9/1990 | Kamemoto |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,782 A | 2/1991 | Sakamoto et al. |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,023,721 A | 6/1991 | Moon-Hwan |
| 5,027,400 A | 6/1991 | Baji et al. |
| 5,031,045 A | 7/1991 | Kawasaki |
| 5,036,314 A | 7/1991 | Barillari et al. |
| 5,038,211 A | 8/1991 | Hallenbeck |
| 5,040,067 A | 8/1991 | Yamazaki |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,205 A | 1/1992 | Arai |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,279 A | 4/1992 | Ando |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,128,766 A | 7/1992 | Choi |
| 5,146,335 A | 9/1992 | Kim et al. |
| 5,148,154 A | 9/1992 | MacKay et al. |
| 5,148,275 A | 9/1992 | Blatter et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,019 A | 11/1992 | Emanuel |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,561 A | 2/1994 | Lumelsky et al. |
| 5,283,639 A | 2/1994 | Esch et al. |
| 5,283,819 A | 2/1994 | Glick et al. |
| 5,285,265 A | 2/1994 | Choi et al. |
| 5,299,006 A | 3/1994 | Kim et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,315,392 A | 5/1994 | Ishikawa et al. |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,389,964 A | 2/1995 | Oberle et al. |
| 5,390,027 A | 2/1995 | Henmi et al. |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |

(56) References Cited

U.S. PATENT DOCUMENTS

| | | |
|---|---|---|
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,625 A | 7/1995 | Willis |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh |
| 5,453,796 A | 9/1995 | Duffield et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Caries |
| 5,523,794 A | 6/1996 | Mankovitz et al. |
| 5,523,796 A | 6/1996 | Marshall et al. |
| 5,524,195 A | 6/1996 | Clanton, III et al. |
| 5,525,795 A | 6/1996 | MacGregor et al. |
| 5,526,034 A | 6/1996 | Hoarty et al. |
| 5,527,257 A | 6/1996 | Piramoon |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,584,025 A | 12/1996 | Keithley et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,365 A | 2/1997 | Kondo et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,606,374 A | 2/1997 | Bertram |
| 5,608,448 A | 3/1997 | Smoral et al. |
| 5,610,653 A | 3/1997 | Abecassis |
| 5,610,664 A | 3/1997 | Bobert |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers, II et al. |
| 5,727,060 A | 3/1998 | Young |
| 5,727,163 A | 3/1998 | Bezos |
| 5,731,844 A | 3/1998 | Rauch et al. |

(56) References Cited

U.S. PATENT DOCUMENTS

| | | |
|---|---|---|
| 5,734,444 A | 3/1998 | Yoshinobu |
| 5,734,720 A | 3/1998 | Salganicoff |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,749,043 A | 5/1998 | Worthy |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,784,258 A | 7/1998 | Quinn |
| 5,790,202 A | 8/1998 | Kummer et al. |
| 5,790,426 A | 8/1998 | Robinson |
| 5,790,835 A | 8/1998 | Case et al. |
| 5,790,935 A | 8/1998 | Payton |
| 5,793,364 A | 8/1998 | Bolanos et al. |
| 5,793,409 A | 8/1998 | Tetsumura |
| 5,793,438 A | 8/1998 | Bedard |
| 5,793,964 A | 8/1998 | Rogers et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,862,292 A | 1/1999 | Kubota et al. |
| 5,864,823 A | 1/1999 | Levitan |
| 5,867,226 A | 2/1999 | Wehmeyer et al. |
| 5,867,227 A | 2/1999 | Yamaguchi |
| 5,870,543 A | 2/1999 | Ronning |
| 5,872,588 A | 2/1999 | Aras et al. |
| 5,874,985 A | 2/1999 | Matthews, III |
| 5,875,108 A | 2/1999 | Hoffberg et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,323 A | 5/1999 | Lawler et al. |
| 5,907,366 A | 5/1999 | Farmer et al. |
| 5,912,696 A | 6/1999 | Buehl |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,936,679 A | 8/1999 | Kasahara et al. |
| 5,940,073 A | 8/1999 | Klosterman et al. |
| 5,940,572 A | 8/1999 | Balaban et al. |
| 5,945,988 A | 8/1999 | Williams et al. |
| 5,951,642 A | 9/1999 | Onoe et al. |
| 5,953,005 A | 9/1999 | Liu |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,912 A | 12/1999 | Wodarz et al. |
| 6,002,393 A | 12/1999 | Hite et al. |
| 6,002,394 A | 12/1999 | Schein et al. |
| 6,002,444 A | 12/1999 | Marshall et al. |
| 6,005,562 A | 12/1999 | Shiga et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,028,600 A | 2/2000 | Rosin et al. |
| 6,029,045 A | 2/2000 | Picco et al. |
| 6,029,176 A | 2/2000 | Cannon |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |

(56) References Cited

U.S. PATENT DOCUMENTS

| | | |
|---|---|---|
| 6,064,980 A | 5/2000 | Jacobi et al. |
| 6,067,303 A | 5/2000 | Aaker et al. |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,081,830 A | 6/2000 | Schindler |
| 6,088,722 A | 7/2000 | Herz et al. |
| 6,091,883 A | 7/2000 | Artigalas et al. |
| 6,098,065 A | 8/2000 | Skillen et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,141,003 A | 10/2000 | Chor et al. |
| 6,147,714 A | 11/2000 | Terasawa et al. |
| 6,147,715 A | 11/2000 | Yuen et al. |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,201,536 B1 | 3/2001 | Hendricks et al. |
| 6,202,212 B1 | 3/2001 | Sturgeon et al. |
| 6,209,129 B1 | 3/2001 | Carr et al. |
| 6,209,130 B1 | 3/2001 | Rector, Jr. et al. |
| 6,216,264 B1 | 4/2001 | Maze et al. |
| 6,237,145 B1 | 5/2001 | Narasimhan et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,282,713 B1 | 8/2001 | Kitsukawa et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang |
| 6,312,336 B1 | 11/2001 | Handelman et al. |
| 6,320,588 B1 | 11/2001 | Palmer et al. |
| 6,323,911 B1 | 11/2001 | Schein et al. |
| 6,323,931 B1 | 11/2001 | Fujita et al. |
| 6,331,877 B1 | 12/2001 | Bennington et al. |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,363,525 B1 | 3/2002 | Dougherty et al. |
| 6,366,890 B1 | 4/2002 | Usrey |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,493,876 B1 | 12/2002 | DeFreese et al. |
| 6,496,981 B1 * | 12/2002 | Wistendahl .......... G11B 27/034 345/619 |
| 6,498,895 B2 | 12/2002 | Young et al. |
| 6,505,348 B1 | 1/2003 | Knowles et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,704,931 B1 | 3/2004 | Schaffer et al. |
| 6,718,551 B1 | 4/2004 | Swix et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,745,391 B1 | 6/2004 | Macrae et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,847,387 B2 | 1/2005 | Roth |
| 6,857,131 B1 | 2/2005 | Yagawa et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,017,173 B1 * | 3/2006 | Armstrong et al. ............ 725/87 |
| 7,028,326 B1 | 4/2006 | Westlake et al. |
| 7,039,935 B2 | 5/2006 | Knudson et al. |
| 7,047,550 B1 | 5/2006 | Yasukawa et al. |
| 7,069,576 B1 | 6/2006 | Knudson et al. |
| 7,100,185 B2 | 8/2006 | Bennington et al. |
| 7,117,518 B1 | 10/2006 | Takahashi et al. |
| 7,185,355 B1 | 2/2007 | Ellis et al. |
| 7,187,847 B2 | 3/2007 | Young et al. |
| 7,266,833 B2 | 9/2007 | Ward, III et al. |

(56) References Cited

U.S. PATENT DOCUMENTS

| | | | |
|---|---|---|---|
| 7,287,267 | B2 | 10/2007 | Knudson et al. |
| 7,293,276 | B2 | 11/2007 | Phillips et al. |
| 7,328,450 | B2 | 2/2008 | Macrae et al. |
| 7,392,532 | B2 | 6/2008 | White et al. |
| 7,480,929 | B2 | 1/2009 | Klosterman et al. |
| 7,487,528 | B2 | 2/2009 | Satterfield et al. |
| 7,487,529 | B1 | 2/2009 | Orlick |
| 7,493,641 | B2 | 2/2009 | Klosterman et al. |
| 7,503,055 | B2 | 3/2009 | Reynolds et al. |
| 7,634,786 | B2 | 12/2009 | Knee et al. |
| 7,665,109 | B2 | 2/2010 | Matthews, III et al. |
| 7,779,437 | B2 | 8/2010 | Barton |
| 8,490,134 | B2 | 7/2013 | Gerba et al. |
| 8,863,170 | B2 | 10/2014 | Moore et al. |
| 2001/0001160 | A1 | 5/2001 | Shoff et al. |
| 2001/0013124 | A1 | 8/2001 | Klosterman |
| 2001/0029610 | A1 | 10/2001 | Corvin et al. |
| 2001/0042246 | A1 | 11/2001 | Yuen et al. |
| 2001/0047298 | A1 | 11/2001 | Moore et al. |
| 2001/0049820 | A1 | 12/2001 | Barton |
| 2001/0054181 | A1 | 12/2001 | Corvin |
| 2002/0042913 | A1 | 4/2002 | Ellis et al. |
| 2002/0042914 | A1 | 4/2002 | Walker et al. |
| 2002/0042918 | A1 | 4/2002 | Townsend et al. |
| 2002/0049973 | A1 | 4/2002 | Alten et al. |
| 2002/0059602 | A1 | 5/2002 | Macrae et al. |
| 2002/0073424 | A1 | 6/2002 | Ward et al. |
| 2002/0083439 | A1 | 6/2002 | Eldering |
| 2002/0092017 | A1 | 7/2002 | Klosterman et al. |
| 2002/0120933 | A1 | 8/2002 | Knudson et al. |
| 2002/0124249 | A1 | 9/2002 | Shintani et al. |
| 2003/0005432 | A1 | 1/2003 | Ellis et al. |
| 2003/0005445 | A1 | 1/2003 | Schein et al. |
| 2003/0110499 | A1 | 6/2003 | Knudson et al. |
| 2003/0163813 | A1 | 8/2003 | Klosterman et al. |
| 2003/0164858 | A1 | 9/2003 | Klosterman et al. |
| 2003/0177494 | A1 | 9/2003 | Satterfield et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0196203 | A1 | 10/2003 | Ellis et al. |
| 2003/0204847 | A1 | 10/2003 | Ellis et al. |
| 2003/0208756 | A1 | 11/2003 | Macrae et al. |
| 2003/0208758 | A1 | 11/2003 | Schein et al. |
| 2004/0003407 | A1 | 1/2004 | Hanafee et al. |
| 2004/0049787 | A1 | 3/2004 | Maissel et al. |
| 2004/0078809 | A1 | 4/2004 | Drazin |
| 2004/0103439 | A1 | 5/2004 | Macrae et al. |
| 2004/0111742 | A1 | 6/2004 | Hendricks et al. |
| 2004/0139465 | A1 | 7/2004 | Matthews et al. |
| 2004/0168189 | A1 | 8/2004 | Reynolds et al. |
| 2004/0172661 | A1* | 9/2004 | Yagawa ............ H04N 21/8586 725/131 |
| 2004/0194131 | A1 | 9/2004 | Ellis et al. |
| 2004/0194138 | A1 | 9/2004 | Boylan et al. |
| 2005/0010949 | A1 | 1/2005 | Ward et al. |
| 2005/0015804 | A1 | 1/2005 | LaJoie et al. |
| 2005/0097622 | A1 | 5/2005 | Zigmond et al. |
| 2005/0155056 | A1 | 7/2005 | Knee et al. |
| 2005/0157217 | A1 | 7/2005 | Hendricks |
| 2005/0198668 | A1 | 9/2005 | Yuen et al. |
| 2005/0204382 | A1 | 9/2005 | Ellis |
| 2005/0216936 | A1 | 9/2005 | Knudson et al. |
| 2005/0229214 | A1 | 10/2005 | Young et al. |
| 2005/0244138 | A1 | 11/2005 | O'Connor et al. |
| 2005/0278741 | A1 | 12/2005 | Robarts et al. |
| 2005/0283796 | A1 | 12/2005 | Flickinger |
| 2006/0248555 | A1 | 11/2006 | Eldering |
| 2007/0016926 | A1 | 1/2007 | Ward et al. |
| 2007/0033613 | A1 | 2/2007 | Ward et al. |
| 2007/0162934 | A1 | 7/2007 | Roop et al. |
| 2007/0186240 | A1 | 8/2007 | Ward et al. |
| 2007/0234393 | A1 | 10/2007 | Walker et al. |
| 2008/0127265 | A1 | 5/2008 | Ward et al. |
| 2008/0127266 | A1 | 5/2008 | Ward et al. |
| 2008/0178221 | A1 | 7/2008 | Schein et al. |
| 2008/0184315 | A1 | 7/2008 | Ellis et al. |
| 2008/0189744 | A1 | 8/2008 | Schein et al. |
| 2008/0235725 | A1 | 9/2008 | Hendricks |
| 2009/0193458 | A1 | 7/2009 | Finseth et al. |
| 2010/0319013 | A1 | 12/2010 | Knudson et al. |
| 2011/0035771 | A1 | 2/2011 | Ward, III et al. |

FOREIGN PATENT DOCUMENTS

| | | |
|---|---|---|
| AU | 733993 B2 | 5/2001 |
| AU | 760568 B2 | 5/2003 |
| AU | 765648 B2 | 9/2003 |
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 2151458 A1 | 6/1994 |
| CA | 2164608 A1 | 12/1994 |
| CA | 2285645 A1 | 7/1998 |
| CA | 2297039 A1 | 1/1999 |
| CA | 2312326 A1 | 6/1999 |
| CA | 2322217 A1 | 9/1999 |
| CA | 2324278 A1 | 11/1999 |
| CA | 2513282 A1 | 11/1999 |
| CN | 1226030 A | 8/1999 |
| CN | 1555191 | 12/2004 |
| DE | 29 18 846 | 11/1980 |
| DE | 3246225 A1 | 6/1984 |
| DE | 3337204 | 4/1985 |
| DE | 36 21 263 A1 | 1/1988 |
| DE | 3702220 A1 | 8/1988 |
| DE | 3909334 A1 | 9/1990 |
| DE | 41 43 074 A1 | 7/1992 |
| DE | 4201031 A1 | 7/1993 |
| DE | 4440419 A1 | 5/1996 |
| DE | 19 531 121 A1 | 2/1997 |
| DE | 19 740 079 A1 | 3/1999 |
| DE | 19 931 046 A1 | 1/2001 |
| DE | 42 90 947 B4 | 11/2006 |
| EP | 0 222 025 A1 | 5/1987 |
| EP | 0 229 526 A2 | 7/1987 |
| EP | 0 239 884 A1 | 10/1987 |
| EP | 0337336 A2 | 10/1989 |
| EP | 0339675 | 11/1989 |
| EP | 0 393 555 | 10/1990 |
| EP | 0396062 A2 | 11/1990 |
| EP | 0401930 | 12/1990 |
| EP | 0408892 A1 | 1/1991 |
| EP | 0420123 A2 | 4/1991 |
| EP | 0424648 A2 | 5/1991 |
| EP | 0444496 | 9/1991 |
| EP | 0447968 A2 | 9/1991 |
| EP | 0488379 | 6/1992 |
| EP | 497 235 | 8/1992 |
| EP | 0532322 A2 | 3/1993 |
| EP | 0550911 A1 | 7/1993 |
| EP | 0 560 593 | 9/1993 |
| EP | 0 572 090 | 12/1993 |
| EP | 0 620 689 A1 | 10/1994 |
| EP | 0624039 A2 | 11/1994 |
| EP | 0 673 164 A1 | 9/1995 |
| EP | 0 682 452 A2 | 11/1995 |
| EP | 0721253 A2 | 7/1996 |
| EP | 0725539 A2 | 8/1996 |
| EP | 0752767 A2 | 1/1997 |
| EP | 0753964 | 1/1997 |
| EP | 0762751 A2 | 3/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0 806 111 A1 | 11/1997 |
| EP | 0805594 A2 | 11/1997 |
| EP | 0822718 | 2/1998 |
| EP | 0827340 A2 | 3/1998 |
| EP | 0834798 | 4/1998 |
| EP | 0848554 A2 | 6/1998 |

(56) References Cited

FOREIGN PATENT DOCUMENTS

| | | |
|---|---|---|
| EP | 0849948 | 6/1998 |
| EP | 0 854645 | 7/1998 |
| EP | 0851681 | 7/1998 |
| EP | 0852442 A1 | 7/1998 |
| EP | 0854654 | 7/1998 |
| EP | 0880856 A1 | 12/1998 |
| EP | 0905985 A2 | 3/1999 |
| EP | 0924927 | 6/1999 |
| EP | 0935393 A2 | 8/1999 |
| EP | 0944253 A1 | 9/1999 |
| EP | 0963119 A1 | 12/1999 |
| EP | 0988876 A1 | 3/2000 |
| EP | 1 058 999 A1 | 12/2000 |
| EP | 1095504 A2 | 5/2001 |
| EP | 1 272 963 A2 | 1/2003 |
| EP | 1036466 | 3/2003 |
| EP | 2 309 440 A1 | 4/2011 |
| FR | 2662895 A1 | 12/1991 |
| GB | 1 554 411 | 10/1979 |
| GB | 2034995 A | 6/1980 |
| GB | 2126002 A | 3/1984 |
| GB | 2185670 A | 7/1987 |
| GB | 2217144 A | 10/1989 |
| GB | 2256546 A | 12/1992 |
| GB | 2305049 A | 3/1997 |
| GB | 2309134 A | 7/1997 |
| HK | 1035285 | 3/2005 |
| JP | 58137334 A | 8/1983 |
| JP | 58137344 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060384 A | 3/1987 |
| JP | 63234679 A | 9/1988 |
| JP | 01307944 A | 12/1989 |
| JP | 02048879 A | 2/1990 |
| JP | 03063990 A | 3/1991 |
| JP | 04227380 | 8/1992 |
| JP | 05-122692 A | 5/1993 |
| JP | 05-183826 | 7/1993 |
| JP | 05284437 | 10/1993 |
| JP | 06021907 | 1/1994 |
| JP | 60-61935 A | 3/1994 |
| JP | 06-295312 A | 10/1994 |
| JP | 0723356 | 1/1995 |
| JP | 07020254 A | 1/1995 |
| JP | 07-050259 | 2/1995 |
| JP | 07-076592 | 3/1995 |
| JP | 07123326 | 5/1995 |
| JP | 07147657 A | 6/1995 |
| JP | 7-262200 A | 10/1995 |
| JP | 07-288759 | 10/1995 |
| JP | 07-321748 | 12/1995 |
| JP | 08-32528 | 2/1996 |
| JP | 0832538 | 2/1996 |
| JP | 08125497 | 5/1996 |
| JP | 08251122 | 9/1996 |
| JP | 08275077 | 10/1996 |
| JP | 08-331546 A | 12/1996 |
| JP | 09037151 A | 2/1997 |
| JP | 9037168 | 2/1997 |
| JP | 09037172 A | 2/1997 |
| JP | 09-102827 A | 4/1997 |
| JP | 09-247565 A | 9/1997 |
| JP | 09-261609 A | 10/1997 |
| JP | 10-501936 | 2/1998 |
| JP | 10-143340 | 5/1998 |
| JP | 10-143349 | 5/1998 |
| JP | 2838892 | 10/1998 |
| JP | 10-512420 | 11/1998 |
| JP | 2001-213595 | 8/2001 |
| JP | 2001-1513595 | 8/2001 |
| JP | 2002-279969 | 9/2002 |
| JP | 2006101548 A | 4/2006 |
| JP | 4062577 | 3/2008 |
| WO | WO-86/01359 A1 | 2/1986 |
| WO | WO-86/01962 | 3/1986 |
| WO | WO-87/03766 | 6/1987 |
| WO | WO-88/04057 A1 | 6/1988 |
| WO | WO-88/04507 | 6/1988 |
| WO | WO-8902682 A1 | 3/1989 |
| WO | WO-89/03085 | 4/1989 |
| WO | WO-89/12370 | 12/1989 |
| WO | WO-90/01243 A1 | 2/1990 |
| WO | WO-90/15507 | 12/1990 |
| WO | WO-9100670 | 1/1991 |
| WO | WO-91/18476 A1 | 11/1991 |
| WO | WO-92/04801 | 3/1992 |
| WO | WO-9304473 | 3/1993 |
| WO | WO-9305452 A1 | 3/1993 |
| WO | WO-93/11638 | 6/1993 |
| WO | WO-93/11639 | 6/1993 |
| WO | WO-93/11640 | 6/1993 |
| WO | WO-93/23957 A1 | 11/1993 |
| WO | WO-94/13107 | 6/1994 |
| WO | WO-94/14281 A1 | 6/1994 |
| WO | WO-94/14283 A1 | 6/1994 |
| WO | WO-94/14284 A1 | 6/1994 |
| WO | WO-9421085 A1 | 9/1994 |
| WO | WO-94/23383 A1 | 10/1994 |
| WO | WO-94/29811 A1 | 12/1994 |
| WO | WO-95/01056 | 1/1995 |
| WO | WO-95/01058 A1 | 1/1995 |
| WO | WO-95/01059 A1 | 1/1995 |
| WO | WO-95/06389 A1 | 3/1995 |
| WO | WO-95/07003 | 3/1995 |
| WO | WO-95/10910 | 4/1995 |
| WO | WO-95/15658 A1 | 6/1995 |
| WO | WO-95/16568 A1 | 6/1995 |
| WO | WO-9515649 A1 | 6/1995 |
| WO | WO-9515657 A1 | 6/1995 |
| WO | WO-95/19092 A1 | 7/1995 |
| WO | WO-95/26608 A1 | 10/1995 |
| WO | WO-95/28055 A1 | 10/1995 |
| WO | WO-95/28799 A1 | 10/1995 |
| WO | WO-95/30961 A1 | 11/1995 |
| WO | WO-95/32585 | 11/1995 |
| WO | WO-9531069 | 11/1995 |
| WO | WO-9532583 A1 | 11/1995 |
| WO | WO-96/07270 A1 | 3/1996 |
| WO | WO-96/08109 A1 | 3/1996 |
| WO | WO-96/09721 A1 | 3/1996 |
| WO | WO-9608113 A1 | 3/1996 |
| WO | WO-96/13932 A1 | 5/1996 |
| WO | WO-9613935 A1 | 5/1996 |
| WO | WO-96/17467 A2 | 6/1996 |
| WO | WO-9617473 | 6/1996 |
| WO | WO-96/21990 A2 | 7/1996 |
| WO | WO-96/26605 | 8/1996 |
| WO | WO-9627270 A1 | 9/1996 |
| WO | WO-9627982 | 9/1996 |
| WO | WO-96/31980 A1 | 10/1996 |
| WO | WO-96/34467 A1 | 10/1996 |
| WO | WO-96/34486 A1 | 10/1996 |
| WO | WO-96/34491 A1 | 10/1996 |
| WO | WO-96/38799 A1 | 12/1996 |
| WO | WO-96/41477 A1 | 12/1996 |
| WO | WO-96/41478 A1 | 12/1996 |
| WO | WO-9641471 A1 | 12/1996 |
| WO | WO-97/02702 A2 | 1/1997 |
| WO | WO-97/04595 A1 | 2/1997 |
| WO | WO-9707656 | 3/1997 |
| WO | WO-97/12486 | 4/1997 |
| WO | WO-97/13368 | 4/1997 |
| WO | WO-97/17774 A1 | 5/1997 |
| WO | WO-97/18675 | 5/1997 |
| WO | WO-97/26612 A1 | 7/1997 |
| WO | WO-97/29458 A1 | 8/1997 |
| WO | WO-97/31480 | 8/1997 |
| WO | WO-9734414 | 9/1997 |
| WO | WO-97/41673 A2 | 11/1997 |

(56) References Cited

FOREIGN PATENT DOCUMENTS

| WO | WO-97/42763 | 11/1997 |
|---|---|---|
| WO | WO-97/48230 | 12/1997 |
| WO | WO-97/49237 | 12/1997 |
| WO | WO-97/49241 | 12/1997 |
| WO | WO-97/49242 | 12/1997 |
| WO | WO-98/00975 A1 | 1/1998 |
| WO | WO-98/00976 | 1/1998 |
| WO | WO-98/06219 | 2/1998 |
| WO | WO-98/10589 A1 | 3/1998 |
| WO | WO-98/16062 | 4/1998 |
| WO | WO-98/17064 A1 | 4/1998 |
| WO | WO-98/20675 A1 | 5/1998 |
| WO | WO-98/26584 | 6/1998 |
| WO | WO-98/27723 | 6/1998 |
| WO | WO-9826569 A2 | 6/1998 |
| WO | WO-98/28906 A2 | 7/1998 |
| WO | WO-98/31148 A1 | 7/1998 |
| WO | WO-98/37695 | 8/1998 |
| WO | WO-98/39893 A2 | 9/1998 |
| WO | WO-98/41020 A1 | 9/1998 |
| WO | WO-98/43183 A1 | 10/1998 |
| WO | WO-98/47279 | 10/1998 |
| WO | WO-98/48566 A2 | 10/1998 |
| WO | WO-98/56172 A1 | 12/1998 |
| WO | WO-98/56712 A1 | 12/1998 |
| WO | WO-99/01984 A1 | 1/1999 |
| WO | WO-99/04561 | 1/1999 |
| WO | WO-99/07142 A1 | 2/1999 |
| WO | WO-99/14947 A1 | 3/1999 |
| WO | WO-99/22502 A1 | 5/1999 |
| WO | WO-99/29109 A1 | 6/1999 |
| WO | WO-99/30491 A1 | 6/1999 |
| WO | WO-99/39280 | 8/1999 |
| WO | WO-99/45700 | 9/1999 |
| WO | WO-99/45702 | 9/1999 |
| WO | WO-99/56466 | 11/1999 |
| WO | WO-99/60783 | 11/1999 |
| WO | WO-99/60789 | 11/1999 |
| WO | WO-00/02380 A2 | 1/2000 |
| WO | WO-00/04706 A2 | 1/2000 |
| WO | WO-00/04708 A1 | 1/2000 |
| WO | WO-0005889 A1 | 2/2000 |
| WO | WO-00/11865 A1 | 3/2000 |
| WO | WO-00/13415 A2 | 3/2000 |
| WO | WO-00/16548 | 3/2000 |
| WO | WO-00/28734 | 5/2000 |
| WO | WO-0027122 A1 | 5/2000 |
| WO | WO-00/33560 A2 | 6/2000 |
| WO | WO-00/33573 A1 | 6/2000 |
| WO | WO-0033160 A2 | 6/2000 |
| WO | WO-0033224 A1 | 6/2000 |
| WO | WO-00/49801 A1 | 8/2000 |
| WO | WO-00/79798 | 12/2000 |
| WO | WO-01/01677 A1 | 1/2001 |
| WO | WO-01/06784 A2 | 1/2001 |
| WO | WO-01/15438 A1 | 3/2001 |
| WO | WO-0119086 | 3/2001 |
| WO | WO-01/35662 A1 | 5/2001 |
| WO | WO-0146869 | 6/2001 |
| WO | WO-0150743 | 7/2001 |
| WO | WO-0158158 | 8/2001 |
| WO | WO-01/75649 A2 | 10/2001 |
| WO | WO-01/89213 A1 | 11/2001 |
| WO | WO-02/31731 A2 | 4/2002 |
| WO | WO-02/084992 A2 | 10/2002 |

OTHER PUBLICATIONS

European Telecommunication Standard, "Electronic Programme Guide (EPG); Protocol for a TV Guide using electronic data transmission", pp. 1-45, sections 1-11.12.7 and annex A-P, bearinQ a date of May 1997.

Hartwig, Rautenberg, Bollmann, Broadcasting and Processing of Program Guides for Hartwig, Rautenberg, Bollman, "Broadcasing and Processing of Program Guides for Digital Digital TV", SMPTE Journal, pp. 727-732, Oct. 1997.

Matthew D. Miller,"A Scenario for the Deployment of Interactive Multimedia Cable Television Systems in the United States in the 1990's", proceedings of the IEEE, vol. 82, No. 4, Apr. 1994, pp. 585-589.

"Open TV Launches OpenStreamer™ Technology for Broadcasters to Deliver First Ever Real-Time Digital Interactive Television", from the Internet at http://www.opentv.com/news/openstreamer_press_final.htm, printed on Jun. 28, 1999, the document bears a copyright date of 1999.

"OpenTV(R) and Interactive Channel Form Strategic Alliance to Deliver Interactive Programming to Satellite Television Subscribers", from the Internet at Http://www.opentv.com/news/interactivechannelfinal.htm, printed on Jun. 8, 1999.

"Prevue Networks and OpenTV(R) Agree to Work Together on Deploying Interactive Program Guides Worldwide", from the Internet at http://www.opentv.com/news/prevuefinal.htm, printed on Jun. 28, 1999.

Technican White Paper, "OpenTV™ Operating Environment". (© 1998 OpenTV Inc.), pp. 1-12.

Sato, T. et al., WWW jou no eizou browsing kikou no teian to Jitsugen [A Proposal for A Video Browsing Mechanism on World Wide Web and its Implementation], Japan Society for Software Science and Technology, collection of $14_1$ convention articles, Japan, Japan Society for software Science and Technology, Sep. 30, 1997, p. 193-196.

Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, p. 65-72.

"'Duck Tales,'(1987)[TV Series 1987-1990]," Internet Movie Database (IMDB) [Retrieved on Apr. 7, 2007].

"2720R Satellite Receiver User's Guide," General Instrument, 1991, pp. 58-61.

"Addressable Converters: A New Development at CableData," Via Cable, vol. 1, No. 12, Dec. 1981.

"Bell Atlantic Buys Cable TV Company for $22bn," Financial Times (London), Oct. 14, 1993 p. 65.

"Cable Television Equipment," Jerrold Communications Publication, dated 1992 and 1993, pp. 8-2.1 to 8-6 and 8-14.1 to 8-14.3.

"Computer Network: Current Status and Outlook on Leading Science and Technology," Bureau of Science & Technology (Japan), vol. 1, Dec. 1986.

Creation/Modification of the Audio Signal Processor Setup for a PC Audio Editor, IBM Technical Disclosure Bulletin, vol. 30, No. 10, Mar. 1988, pp. 367-376.

"D2B-Home Bus Fur Audio and Video," Selektor, Apr. 1990, pp. 10, 12.

"Dial M for Movie", Funkschau Nov. 1994 Perspektiven, Video on Demand, pp. 78-79. (English Ian wage translation attached).

"Digital Video Broadcasting (DVB); DVB specification for data broadcasting," European Telecommunication Standards Institute, Draft EN 301 192 V1.2.1 (Jan. 1999).

"Electronic Programme Guide (EPG); Protocol for a TV Guide using electronic data transmission," by European Telecommunication Standards Institute, May 1997, Valbonne, France, publication No. ETS 300 707.

"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.

"Facsimile Transmission," NHK Research Monthly Report, Dec. 1987(Unknown author).

"Getting Started" Installation Guide, "Using StarSight 1" Manual, and Remote Control "Quick Reference Guide."

"Interactive Computer Conference Server," IBM Technical Bulletin, vol. 34, No. ?A, Dec. 1991, pp. 375-377.

"Interface Device for Conventional TVs to Improve Functionality," IBM Technical Disclosure Bulletin, vol. 36, No. 7, Jul. 1993, pp. 53-54.

(56) References Cited

OTHER PUBLICATIONS

"James Sorce, David Fay, Brian Raila and Robert Virzi, Designing a Broadband Residential Entertainment Service: A Case Study," GTE Laboratories Incorporated, undated, pp. 141-148.

"Lists> What's on Tonite! TV Listings (fwd)," Internet article (On line), Jan. 28, 1995, XP 002378869 fRetrieved on Apr. 28, 2006].

"MSI Datacasting Systems," TV Communications Journal, Jan. 1973.

"Open TV fur interaktives Fernsehen," Trend and Technik, 9-95 RFE, p. 100. (English language translation attached).

"Prevue Networks and OpenTV(R) Agree to Work Together on Deploying Interactive Program Guides Worldwide," from the internet at http://www.opentv.com/news/prevuefinal.htm, <http://www.opentv.com/news/prevuefinal.htm>printed on Jun. 28, 1999.

"Probe XL Brochure, Auto Tote Systems Inc.," (Newark, Delaware) (undated) 57 pgs.

"Prodigy Launches Interactive TV Listing", Apr. 22, 1994 public Broadcasting Report.

"Rewind, reply and unwind with new high-tech TV devices," by Lawrence J. Magid, LA Times. This document was printed from the internet on Jun. 6, 1999 and bears a date of May 19, 1999.

"StarSight Interactive Television Program Guide III" Jim Leftwich and Steve Schein, Functional/Interactional Architecture Specification Document, Orbit Interaction, Palo alto, California, Published before Apr. 19, 1995.

"StarSight Interactive Television Program Guide IV" Jim Leftwich and Steve Schein, Functional/Interactional Architecture Specification Document, Orbit Interaction, Palo Alto, California, Published before Apr. 19, 1995.

"StarSight Interactive Television Program Guide" Jim Leftwich, Willy Lai & Steve Schein Published before Apr. 19, 1995.

"Technological Examination & Basic Investigative Research Report on Image Databases," Japan Mechanical Engineering Organization Int'l Society for the Advancement of Image Software, Japan, Mar. 1988.

"Technology: Turn on, tune in and print out—An experimental interactive television service is set to alter our viewing habits," Financial Times (London), Oct. 14, 1993, p. 11.

"The New Media and Broadcast Policy: An Investigation & Research Conference Report on Broadcasting Diversification," Radio Regulatory Bureau, Japan Ministry of Posts & Telecommunications, Mar. 1982.

"TV Guide Online Set for Fall", Entertainment Marketing Letter, Aug. 1994.

"TV Listings Functional Spec.," Time Video Information Services, Inc., undated.

"Using StarSight 2," Instruction Manual, StarSight Telecast, Inc., Starsight CB 1500 Customer Letter, 1994.

"Windows 98 Feature Combines TV, Terminal and the Internet," New York Times, Aug. 18, 1998.

Advertisement for "TV Decisions," Cable Vision, Aug. 4, 1986.

Alexander, Michael "Visualizing cleared-off desktops," Computerworld, May 6, 1991, p. 20.

Antonoff, M., "Stay Tuned for Smart TV," Popular Science, Nov. 1990, pp. 62-65.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

Baer, R.H, "Innovative Add-On TV Products," IEEE Transactions on Consumer Electronics, vol. CE-25, Nov. 1979, pp. 765-771.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exploration of the NCTA, San Francisco, CA Jun. 6-9, 1993, pp. 223-236. Jun. 6, 1993.

Brochure, "A New Approach to Addressability," CableData, undated.

Brochure, "Westar and Videotoken Network Present the CableComputer," Revised Aug. 15, 1985 (Plaintiffs 334).

Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).

Brochure, VTN "Videotoken Network, New Dimension Television," Dec. 1985 (Plaintiffs Exhibit 313).

Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiff's Exhibit 289).

CableData, Roseville Consumer Presentation, Mar. 1985.

Came, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Office Actions and Replies from U.S. Appl. No. 10/453,388.

Cox, J. et al, "Extended Services in a Digital Compression System," Proceedings from Eleven Technical Sessions: 42nd Annual Convention and Exposition of the National Cable Television Association, Jun. 1993, pp. 185-191.

Damouny, N.G., "Teletext Decoders-Keeping Up With the Latest Advances," IEEE Transactions on Consumer Electronics, vol. CE-30, No. 3, Au wst 1984, pp. 429-435.

Declaration Under 37 C.F.R. § 1.132 of Richard E. Glassberg, signed Oct. 20, 2006, filed Oct. 24, 2006, from U.S. Appl. No. 10/346,266.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, vol. 83 No. 1, pp. 14-19.

Eitz, Gerhard, "ZukOnftige Informations-und Datenangebote beim digitalen Femsehen-EPG Und 'Lesezeichen'," RTM Rundfunktechnische Mitteilunqen, Jun. 1997, vol. 41, pp. 67-72.

Hedger, J., "Telesoftware: Home Computing Via Broadcast Teletext," IEEE Transactions on Consumer Electronics, vol. CE-25, No. 3, Jul. 1979, pp. 279-287.

Hiroshi Ishii et al, "Ciearface: Translucent Multiuser Interface for TeamWorkStation," ECSCW, Sep. 1991, pp. 6-10.

Hiroshi Ishii et al, "Toward an Open Shared Workspace: Computer and Video Fusion Approach of Team Workstation," Communications of the ACM, Dec. 1991, vol. 34 No. 12, pp. 37-50.

Hirotada Ueda et al, "Impact: An Interactive Natural-Motion-Picture Dedicated Multi-Media Authoring System," Communications of the ACM, Mar. 1991, pp. 343-350.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Installation Guide, "Getting Started 1" Manual, and Remote Control "Quick Reference Guide."

Instruction Manual, "Using StarSight 2," StarSight Telecast, Inc., StarSight CB 1500 Customer Letter, 1994.

Instructional Manual, "Sonic the Hedgehog," Sega of America, 1992.

James, A., "Oracle—Broadcasting the Written Word," Wireless World, Jul. 1973, vol. 79 No. 1453, pp. 314-316.

Judice, C.N., "Move Over Cable, Here Comes Video Via Voice Lines," Network World, Sep. 1986, p. 26.

(56) References Cited

OTHER PUBLICATIONS

Kai et al "Development of a Simulation System for Integrated Services Television," Report from Information Processing Society of Japan, Japan, Sep. 13, 1996, vol. 96, No. 90 pgs.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiffs Exhibit 298).
*Listing of computer code for Video HTU Program (Plaintiff's Exhibit 299).*
Lowenstein, R.L. and Aller, H.E., "The Inevitable March of Videotex," Technology Review, vol. 88, Oct. 1985, p. 22.
M/A-COM, Inc., "Videocipher II Satellite Descrambler Owner's Manual," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
*Mar. 19, 1985 letter from G. Knapp of CableData to R. Hansen of Weststar Communications, Inc.* (Plaintiff's Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell, R.G., "Tac Timer," 1986 NCTA Technical Papers, pp. 203-206.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Pfister, Larry T., "Teletext: Its Time Has Come," Prepared for The IGC Videotext / Teletext Conference, Andover, Massachusetts, Dec. 14, 1982, pp. 1-11.
Prevue Guide Brochure, Spring 1984.
Prevue Guide Brochure, Spring 1994.
Rayers, D.J., "Telesoftware by Teletext," 1984 IEEE Conference Papers, vol. 240, p. 323.
Rogers, Telcos vs. Cable TV: The Global View With Markets Converging and Regulatory Barriers Falling, Service Carriers are Ready to Rumble, Data Communications, Sep. 21, 1995, vol. 24, No. 13, pp. 75-76,78,80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.
Schlender, B.R., "Couch Potatoes! Now Its Smart TV," Fortune, Nov. 20, 1989, pp. 111-116.
Schmuckler, Eric "A marriage that's made in cyberspace (television networks pursue links with online information services)," May 16, 1994 MEDIAWEEK, v. 4, No. 20, p. 22(3).
Sealfon, Peggy, "High Tech TV," Photographic, Dec. 1984.
Sunada, K. et al, "Teletext Color Television Receiver Model C-29M950, C26M940," NEC Home Electronics , NEC Giho, 1987.
Sussman, A. "GTE Tunes in to Home TV Shopping," PC Week, Jun. 28, 1988, p. C15.
Tech Notes: Product Updates from M/A-COM Cable Home Group, "Videocipher Owner's Manual Update," Issue No. 6, Feb. 1986.
*Transcript of the Deposition of John Roop*, Oct. 1996, pp. 186-187.
Trial testimony of Michael Axford, *Prevue Interactive, Inc. and United Video Satellite Group, Inc. v. StarsiQht Telecast, Inc.*, May 9, 1998, pp. 186-187, 295-315, and 352-357.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
Contents of the website of StarSight Telecast, Inc. (http://www.StarSight.com) as of Apr. 21.
Dinwiddie et al., Combined-User Interface for Computers, Televison, Video Recorders, and.
Telephone, etc. IBM Technical Disclosure Bulletin, vol. 33(3B), pp. 116-118 (1990).
IPG Attitude and Usage Study, prepared by Lieberman Research Worldwide for Gemstar-TV Guide International, Oct. 2002.
Letter from StarSight Telecast, Inc. to a StarSight IPG subscriber (with subscriber name, address and account number redacted) notifying the subscriber of termination of the StarSight IPG, 2003.
Oberlies, et al.; "VPS-Anzeige Und Uberwachungsgerat", Rundfunktechnische Mitteilungen, vol. 30, No. 1 Jan. 1986-Feb. 1986, Norderstedt (DE).
Prevue Networks, Inc. Promotional Materials, 1994.
RCA Satellite Receiver User's Manual, 2001.

* cited by examiner

SYSTEM AND METHOD FOR METADATA-LINKED ADVERTISEMENTS

CROSS REFERENCE TO RELATED APPLICATION

This application is a continuation of U.S. patent application Ser. No. 12/635,459, filed Dec. 10, 2009, which is a continuation of U.S. patent application Ser. No. 09/823,588, filed Mar. 30, 2001, which claims the benefit of U.S. Provisional Patent Application No. 60/193,948, filed Mar. 31, 2000. The aforementioned, previously filed applications are hereby incorporated by reference herein in their entireties.

BACKGROUND OF THE INVENTION

This invention relates to advertisement delivery systems and methods. More particularly, this invention relates to systems and methods that associate advertisements with other media using metadata links.

With the advent of modern television equipment and communication networks, advertisers have been able to provide graphical advertisements to viewers such as ordinary television commercials. However, in the past, these systems were limited in their functional capabilities and typically only provided non-content or semi-content related advertisements to viewers.

To increase the effectiveness of advertisements, it may be advantageous to both advertisers and consumers alike to associate what is being advertised with other media (e.g., programs, applications, etc) that are provided to viewers. Associating these advertisements with other media may not only tend to increase the effectiveness of the advertisements, but doing so may also provide users with an increased awareness of the content of such other media, as opposed to simply being subject to an advertisement for a product or service without being provided additional information.

It is, therefore, an object of the invention to provide systems and methods for associating advertisements with other media using metadata.

SUMMARY OF THE INVENTION

In accordance with this and other objects of the present invention, systems and methods for associating advertisements with other media are provided. These systems and methods may associate advertisements with other media by using an enhanced data set herein referred to as Ametadata@. For example, metadata is data that may be used to describe programming and may include any information that may be associated with a program and/or that may describe the program, its content, or services related to the program.

One aspect of the present invention may include advertisements that are targeted to other media based on metadata contained within such other media. For example, metadata may be provided at the scene level of a program. By providing metadata at the scene level, more descriptive information about a program or other media can be provided in a more temporally associated way.

Another aspect of the invention may include advertisements that are provided within display screens of guidance applications based on metadata of other media attached to or associated with the guidance application. For example, in an interactive program guide, advertisements may be presented in a browse overlay and such advertisements may be based on metadata associated with a currently selected program listing. In addition, the interactive program guide may present advertisements in a menu or guide overlay based upon the metadata associated with the last program viewed.

A further aspect of the invention may include metadata that contains a source reference for an advertisement. The source reference may be, for example, a Uniform Resource Locator (URL). This source reference may be recorded or otherwise stored by a guidance application. For example, on playback of the recorded program, the guidance application may play back advertisements from a location defined by the source.

Still a further aspect of the invention may include enabling a system provider to manage advertisement inventories and to provide marketing and other data to advertisers. For example, through polling, monitoring user requests, or using any other scheme suitable to the chosen implementation of the system, a system provider may track valuable marketing information and provide such information to advertisers.

BRIEF DESCRIPTION OF THE DRAWINGS

The above and other objects and advantages of the invention will be apparent upon consideration of the following detailed description taken in conjunction with the accompanying drawings in which like reference characters refer to like parts throughout and in which.

DETAILED DESCRIPTION OF THE PREFERRED EMBODIMENTS

Figure 1:
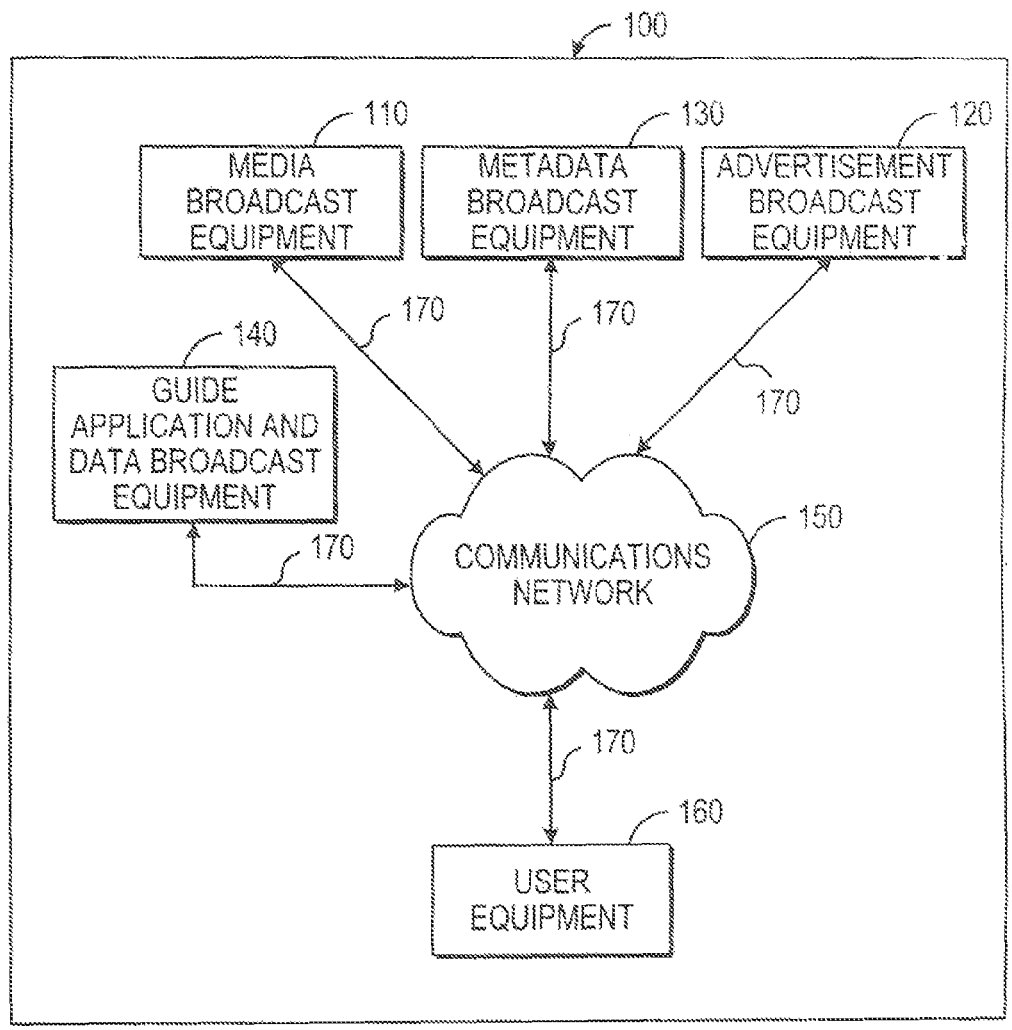
FIG. 1 is a block diagram of a system that may be used to implement various embodiments of the present invention.

The present invention provides systems and methods for associating advertisements with other media (e.g., programs, applications, etc).

These systems and methods may associate advertisements with other media by using an enhanced data set herein referred to as Ametadata@. Metadata may be used to describe programming and may include any information that may be associated with a program and/or that may describe a program, its content, or services related to a program. Metadata may describe, for example, the content of a program, whether commercials may be skipped during playback of a recorded program, or the clothes that an actor is wearing.

Metadata may be transmitted and/or received by a user=s equipment (e.g. a set-top box) through any communications network (e.g., cable systems, satellite systems, modems, wireless paging frequencies, the Internet, etc., or any combination thereof). Furthermore, metadata may be transmitted and/or received by the user=s equipment on one or more broadcast channels. For example, a program may be received on a program channel, and metadata for that program may be received through this program channel=s vertical blanking interval (VBI). Additionally, metadata may be provided by utilizing other existing analog and digital technologies such as the AAdvanced Television Enhancement Forum@ (ATVEF) protocol for enhanced television programming.

One aspect of the present invention may include advertisements that are targeted to other media based on the metadata contained within such other media. For example, metadata may be provided at the scene level of a program. Each scene of the program may show a different product. In one scene, an actor may be driving a certain car or wearing a particular type of clothing. In another scene, the actor may be wearing different clothing, or another actor may be in the shot with other items that may be promoted (e.g., a cell phone, sun glasses, etc). As stated above, these products may be linked to advertisements for these products using metadata. By providing metadata at the scene level, more descriptive information about a program or other media can be provided in a more temporally associated way. In this way, the advertising of a product is enhanced because the viewer can watch the product or service as it is worn, used, or provided.

Another aspect of the invention may include advertisements that are provided within the display screens of guidance applications based on metadata of other media attached to or associated with the guidance application. For example, in an interactive program guide, advertisements may be presented in a browse overlay and such advertisements may be based on metadata associated with a currently selected program listing. The metadata for a program listing may include any descriptive information about the program itself, the channel the program is being displayed on, and/or any other information attached to or associated with the program listing.

Another aspect of the invention may include metadata that contains a source reference for an advertisement. The source reference may be, for example, a Uniform Resource Locator (URL). For example, when a program is recorded, the metadata along with the source reference may be recorded or otherwise stored by a guidance application. On playback of the recorded program, the guidance application may play back advertisements from a source as defined, for example, using a URL contained in the recorded program. A system provider may then replace previously stored and now outdated advertisements with new ones having the same identifier. Therefore, for example, when a program is recorded and subsequently played back, new advertisements may be retrieved and presented simply by changing an advertisement=s identifier.

Another aspect of the invention may include enabling a system provider to manage advertisement inventories and provide marketing and other data to advertisers. The system provider may manage advertisement inventories by providing fresh advertisements, as described above. By providing fresh advertisements, the system provider controls what advertisements the viewer sees when playing back a recorded program. By controlling which advertisement a viewer sees on playback, the system provider may be able to sell playback advertising space to advertisers.

Furthermore, system providers may provide advertisers valuable marketing information and other data. Through polling, monitoring user requests, or using any other scheme suitable to the chosen implementation of the system, a system provider may track valuable marketing information and provide such information to advertisers. Marketing information may include the program recorded, the number of times an advertisement is accessed, the time at which the advertisement was accessed, etc., and may also include demographic information associated with a user=s account.

In one embodiment of the invention, a system may include: one or more receivers that may receive signals and/or data; one or more transmitters that may transmit signals and/or data; a processor that accepts a user=s input signal, that selects an object within the visual plane of a video display, that reads metadata, that selects an advertisement, and that causes the advertisement to be displayed; and one or more storage devices capable of electronically storing signals and/or data.

In another embodiment of the invention, a system may include a processor that accepts a user=s input signal, that reads metadata, that downloads an advertisement, and that causes the advertisement to be displayed.

In still another embodiment of the invention, a system may include a processor that monitors metadata-selected advertisements, that collects data relating to the metadata-selected advertisement, and that causes the data to be recorded.

FIG. 1 is a block diagram of a system 100 that may be used to implement various embodiments of the present invention. System 100 may comprise media broadcast equipment 110, advertisement broadcast equipment 120, metadata broadcast equipment 130, guide application and data broadcast equipment 140, communications network 150, user equipment 160, and communications links 170. Broadcast equipment 110, 120, 130, and 140 may be any suitable equipment for providing media (e.g., programs, applications, and other signals and data), such as video and data servers, live broadcast equipment, video tape players, etc., and may be located at a cable headend or at any other convenient location. In addition, broadcast equipment 110, 120, 130, and 140 may be combined into a single broadcast unit or combined in other ways.

Communication network 150 may be any suitable network for transmitting signals and/or data to and/or from broadcast equipment 110, 120, 130 and 140. For example, network 150 may be the Internet, a satellite communications system, a cable system, a local area network, a wide area network, etc., or any combination of the same. Communication network 150 may use digital or analog technology or any combination thereof.

User equipment 160 may be any suitable equipment for receiving, transmitting, processing and/or displaying signals and/or data received from and/or transmitted to broadcast equipment 110, 120, 130 and 140. For example, user equipment 160 may be a one or two-way set-top box, a television with processing and storing capability, a personal video recorder, a video cassette recorder with suitable processing capabilities, a personal computer, etc.

Communication links 170 may be any suitable links for communicating data and/or signals, such as a dial-up connection, a fiber optic cable, a coaxial cable, a DSL connection, etc., or any combination of the same.

Although not shown in FIG. 1, system 100 may also include one or more remote storage units that may be used to store media, advertisements, metadata, guidance applications and data. These remote storage units may receive media, advertisements, metadata, guidance applications, and other data from broadcast equipment 110, 120, 130, and/or 140, may be controlled by any of broadcast equipment 110, 120, 130, and 140 and user equipment 160, and may provide the media, advertisements, metadata, guidance applications and other data to user equipment 160 via communications network 150.

Figure 2:
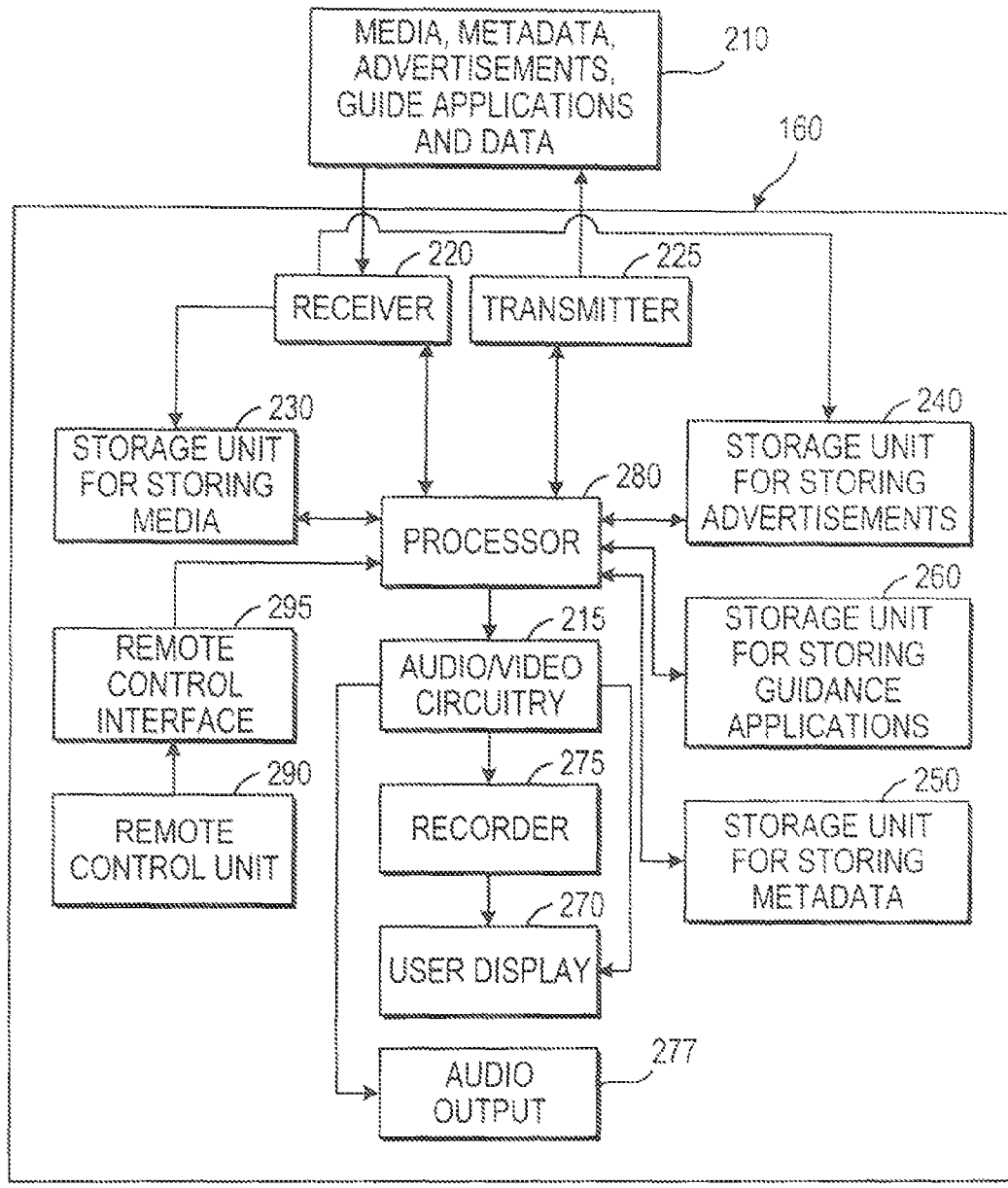
FIG. 2 is a block diagram of user equipment that may be used in accordance with various embodiments of the present invention.

FIG. 2 is a block diagram of user equipment 160 shown in FIG. 1. User equipment 160 may be used in accordance with various embodiments of the present invention. User equipment 160 may include: a receiver 220; a transmitter 225; a processor 280; storage units 230, 240, 250 and 260; a user display 270; a recorder 275; an audio output 277; a remote control unit 290; a remote control interface 295, and audio/video circuitry 215. Receiver 220 may be any suitable equipment for receiving guidance applications and data, and/or any other desired signals or data (e.g., media, advertisements, metadata, guides applications and data, URL addresses, audio, etc). Transmitter 225 may be any suitable equipment for transmitting data and/or any other desired signals. The signals and/or data received and/or transmitted by receiver 220 and transmitter 225 may be transmitted and/or received through any communications network, as described above.

Processor 280 may be any suitable equipment for accepting a user input signal, reading metadata attached to or associated with an advertisement and other media, selecting an advertisement, causing an advertisement to be downloaded from a remote location, and causing an advertisement to be displayed. Storage units 230, 240, 250, and 260 may be used for storing media, advertisements, metadata, audio, and guidance applications and data, respectively. Any of storage units 230, 240, 250, and 260 may be any devices that are capable of storing signals and/or data (e.g., a separate video cassette recorder, a disk drive, a memory card, etc). Storage units 230, 240, 250, and 260, if desired, may also be combined into a single storage unit or combined in other ways. Remote control unit 290 may be a keyboard, a touch screen display, a front panel, or any other wired or wireless device that a user may use to input data. Remote control interface 295 may receive a signal from remote control unit 290 and then send that signal to processor 280. Remote control interface 295 may be, for example, a photo detector. Audio/video circuitry 215 may be any suitable circuitry for converting data from processor 280 into audio and/or video signals for display on display 270, recording on recorder 275, and/or output on audio output 277. Display 270 may be any suitable device for presenting images to a viewer, such as a television, a monitor, a computer monitor, a personal digital assistant, etc. Audio output 277 may be any suitable device or devices for allowing a user to listen to or otherwise provide an audio signal, such as amplifiers, speakers, etc. Audio output 277 may be combined or partly combined with display 270. Finally, recorder 275 may be any suitable device for recording video signals and data, such as a video cassette recorder, a disk drive, a memory card, etc.

Figure 3:
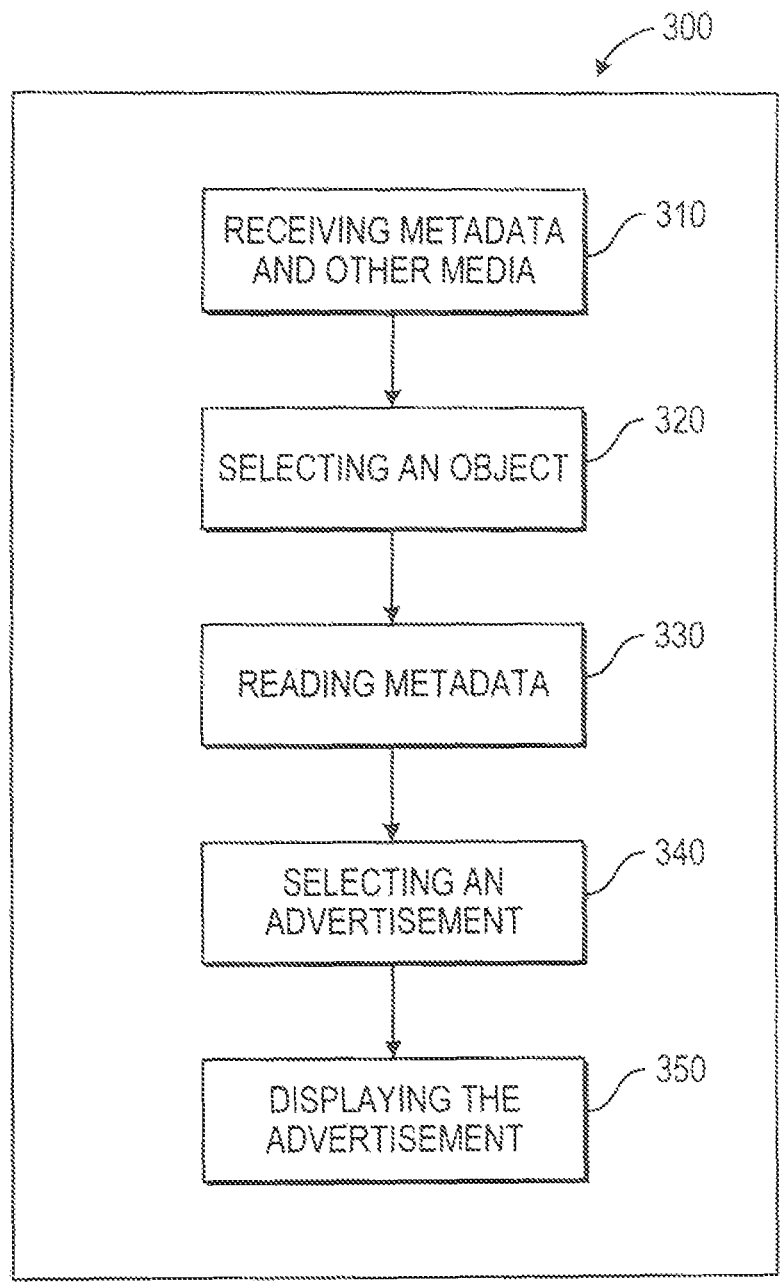
FIG. 3 is a flow chart of a process in which an advertisement may be selected based on the user=s selection of an object and that may be used with various embodiments of the present invention.

FIG. 3 is a flow chart of a process 300 in accordance with various embodiments of the present invention. As illustrated, at step 310, process 300 may begin by receiving metadata and other media. Receiving metadata and other media, as mentioned above, may be accomplished by utilizing a receiver that may receive signals and/or data.

Next, at step 320, process 300 may select an object located within a viewing plane of a viewing device. For example, process 300 may use an audio/video coding method, such as MPEG-4 that allows objects to be defined. The selecting of an object may be accomplished, as mentioned above, by a processor that utilizes a user=s input signal. A user=s input signal may include the selection of an object displayed on a video display unit with a cursor and/or a command to move a cursor displayed on a video display unit to any point within a video display=s viewing plane. A user=s input signal, as described above, may be entered through a wired or wireless remote control unit.

To select an object, the processor may be running software that enables certain objects within the viewing plane of a video device to be selected. For example, the processor may utilize visual pattern recognition software that tracks colors, shapes, etc. Alternatively, the processor may utilize a downloaded predefined selectable target area to select objects displayed within the viewing plane of the viewing device.

At step 330, process 300 may read metadata. The metadata may be attached to and/or associated with media or a selectable object imbedded within the media.

Reading metadata may be accomplished by a processor. The metadata, as described in detail above, may contain characteristics describing media and/or objects. In addition, the metadata may contain a source address (e.g., a URL) to download an advertisement from a remote location, as also described below.

At step 340, process 300 may select an advertisement. The selecting of an advertisement may be based on metadata attached to and/or associated with media and/or a selectable object imbedded within the media. For example, when media and/or a selectable object within the media is selected, the metadata attached to and/or associated with the media and/or selectable object may be read. Then, an advertisement corresponding to the metadata read may be selected. The advertisement may be selected by comparing the metadata of the media or selected object with metadata from advertisements. The advertisements may be provided from a suitable remote location to the user=s equipment at some suitable frequency (e.g., periodically, on-demand, via polling, etc), or may be provided from advertisements previously stored on the user=s system, as will be explained below.

Finally, at step 350, process 300 may display the advertisement within the viewing plane of a viewing device.

Figure 4:
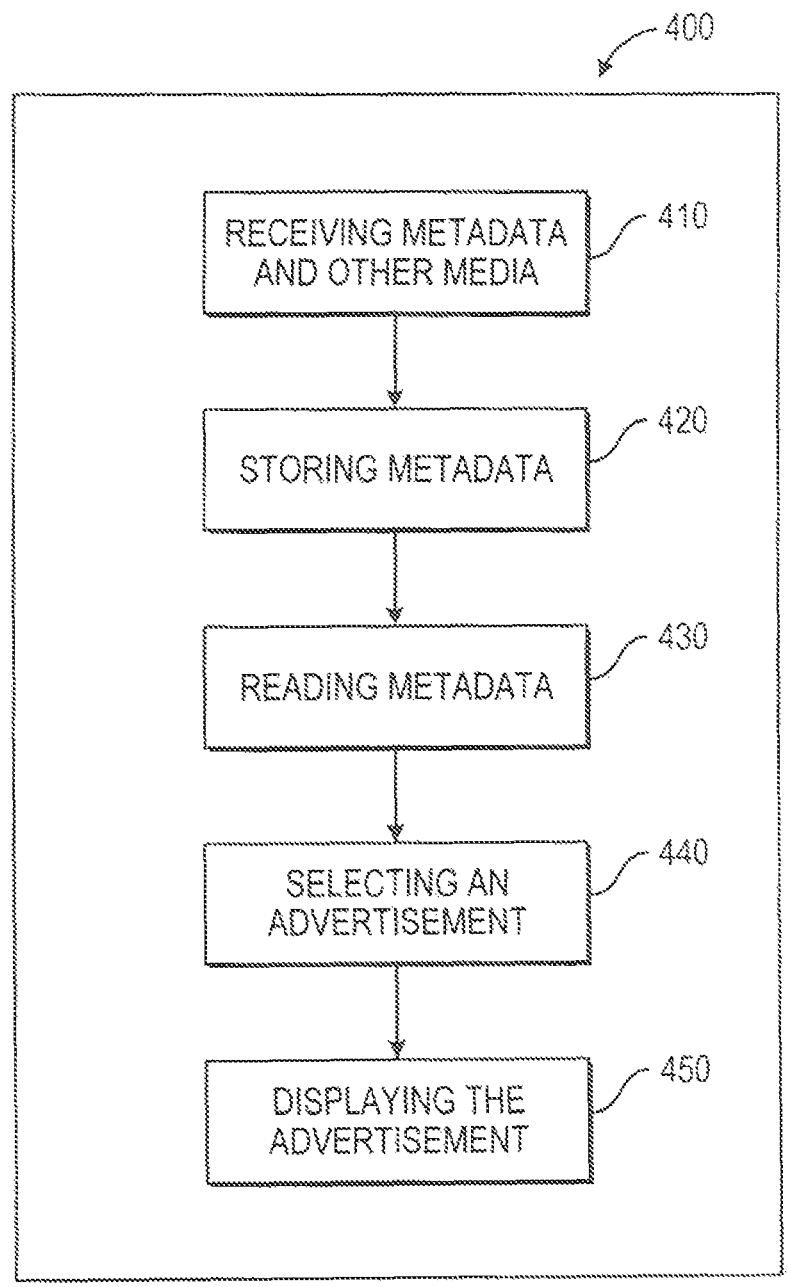
FIG. 4 is a flow chart of a process in which an advertisement may be selected from stored metadata and/or other media and that may be used with various embodiments of the present invention.

FIG. 4 is a flow chart of a process 400 in which metadata may be used to select an advertisement and that may be used to implement various embodiments of the present invention. Process 400 shows the receiving and the reading of metadata and other media as well as the selecting and the displaying of an advertisement at steps 410, 430, 440, and 450 respectively. Steps 410, 430, 440, and 450 are substantially the same as steps 310, 330, 340 and 350 which are described in detail above in connection with FIG. 3. Also shown in process 400 is the storing of metadata and other media at step 420. As stated above, the storing of the metadata and other media may be on any suitable storage unit such as a disk drive, or a memory card, etc. The storage unit may be located locally at or near a user's television viewing equipment, or may be located remotely from the user's viewing equipment.

Figure 5:
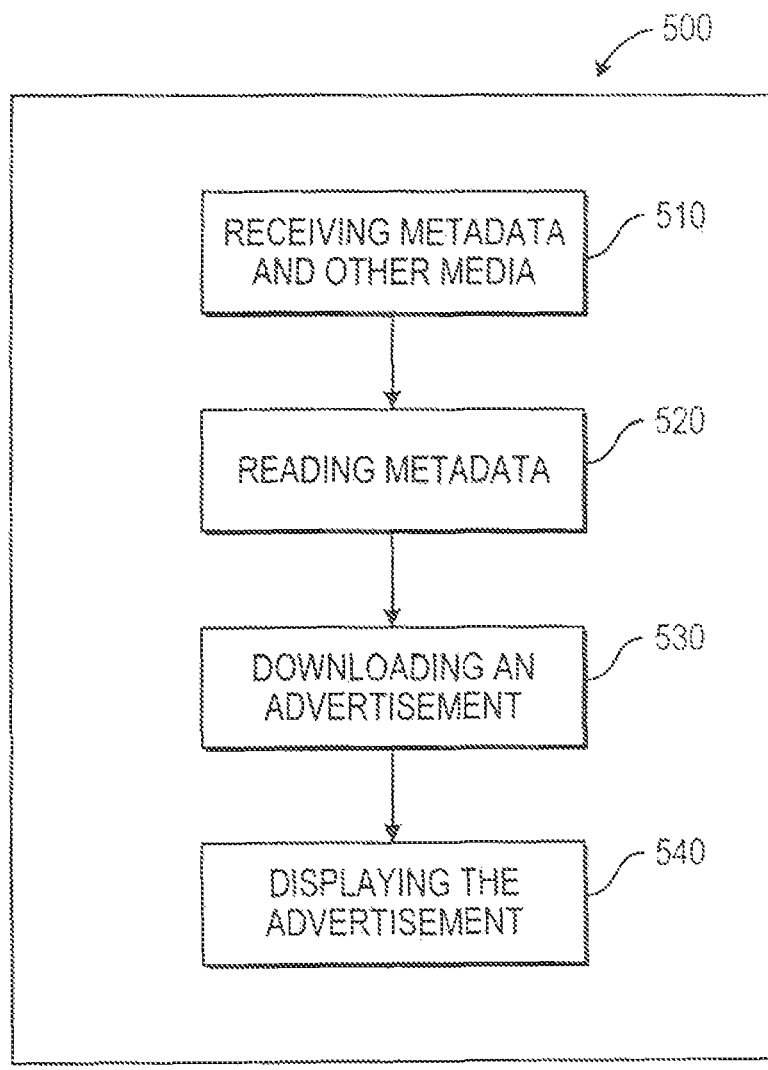
FIG. 5 is a flow chart of a process in which an advertisement may be downloaded using metadata and that may be used with various embodiments of the present invention.

FIG. 5 is a flow chart of a process 500 in which metadata may be used to select an advertisement and that may be used to implement various embodiments of the present invention. Process 500 shows the receiving and the reading of metadata and other media as well as displaying an advertisement at steps 510, 520, and 540 respectively. Steps 510, 520, and 540, are substantially the same as steps 310, 330, and 350 which are described in detail above in connection with FIG. 3. Also shown in process 500 is the downloading of an advertisement based on metadata at step 530. As stated above, metadata may contain a source address (e.g., a URL) to download an advertisement from a remote location. For example, a guidance application utilizing any suitable communication technology (e.g., the Internet using a HyperText Transfer Protocol) may obtain an advertisement by downloading it from a source address. The advertisement that is presented to a viewer may be the advertisement currently available at the source (e.g., a web page). As time passes, the advertiser or the system provider may change the content of the advertisement that is provided to a user by simply modifying the advertisement at the source. In this way, Afresh@ advertisements may be presented each time a user plays back a recorded program.

Alternatively, these Afresh@ advertisements may be provided by, for example, assigning identifiers to a specific advertisement or a group of advertisements. These advertisements with identifiers may be downloaded and stored in the user=s equipment or may be available to a user=s system at some remote location available at some suitable frequency (e.g., periodically, on-demand, via polling, etc).

Figure 6:
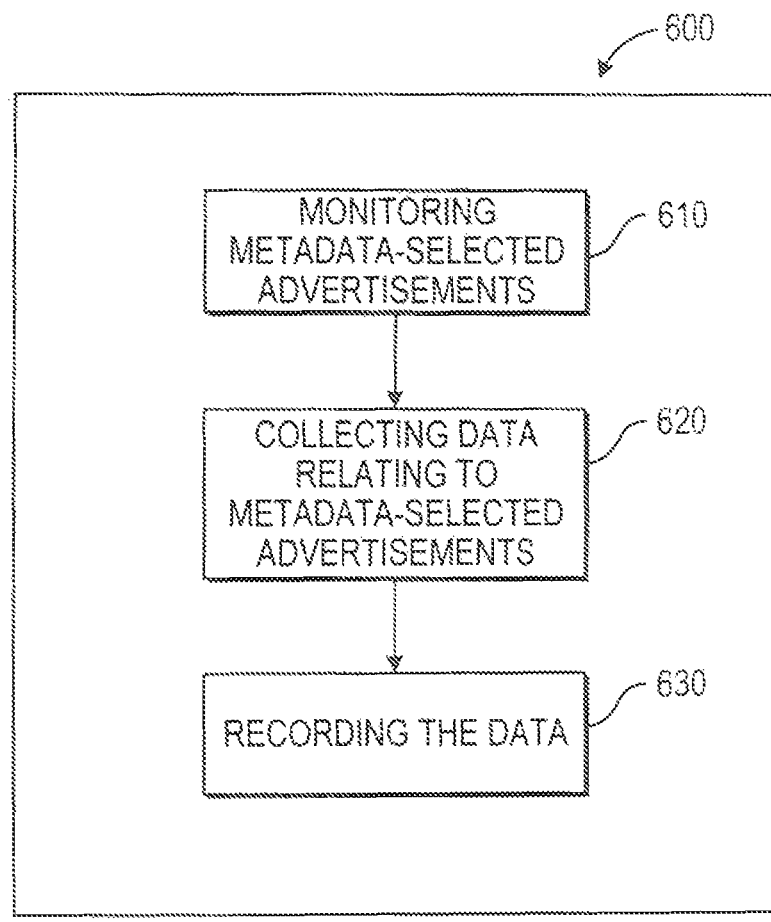
FIG. 6 is a flow chart of a process in which data relating to metadata-selected advertisements may be monitored, collected and recorded and that may be used with various embodiments of the present invention.

FIG. 6 is a flow chart of a process 600 in which data relating to metadata-selected advertisements may be collected and recorded. Process 600 shows monitoring metadata-selected advertisements at step 610. Monitoring of the metadata-selected advertisements may be accomplished through a receiver and/or a processor, as described above in connection with FIG. 2, blocks 220 and 280, respectively. Furthermore, monitoring may be accomplished at any suitable times (e.g. continuously, periodically, on-demand, etc.). Process 600 also shows collecting data relating to metadata-selected advertisements at step 620. Such collecting of data may be accomplished through a processor, as described in detail above. Finally, process 600 shows the recording of the data. Recording the data may be done on any suitable storage unit such as a, a disk drive, or a memory card, etc.

In addition to monitoring, collecting, and recording, marketing information may also be provided to advertisers over a communications network, as described in detail above. For example, marketing information may be provided to advertisers in a real-time or in a block time format. A block-time format may include daily, weekly, monthly, yearly, etc. information. As stated above marketing information may include information such as the program recorded, the number of times an advertisement is accessed, the time at which the advertisement was accessed, etc., and/or include demographic information associated with a user=s account.

Figure 7:
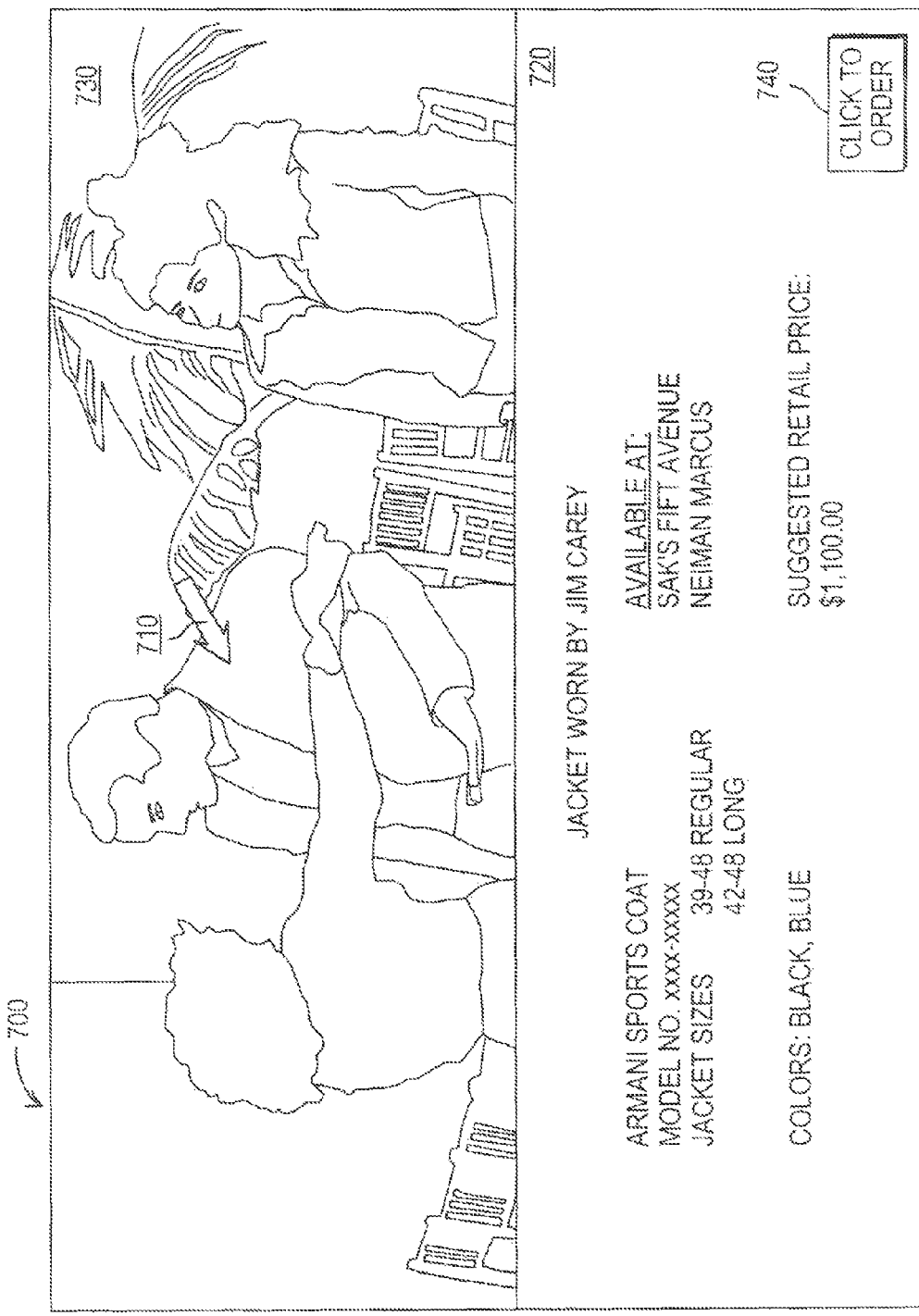
FIG. 7 is an illustration of a screen display that may be used to implement various embodiments of the present invention.

Turning now to FIG. 7, a program advertisement screen 700 shows one example of how advertisements may be selected and displayed in accordance with the present invention. Program advertisement screen 700 may include a cursor 710, a metadata-selected advertisement 720, a scene 730, and order button 740. Scene 730 shows a scene in which the user may select an object. Cursor 710 may be controlled by a user through a user input, as described in detail above, and may also be utilized by a user to select an object within the viewing plane of a video device, as depicted in scene 730. Selected advertisement 720 shows a displayed advertisement for the user selected object. If desired, the user may then select order button 740 to order the selected item. The selected item may be charged to a user credit card number, a user=s account, and/of any other method or purchasing items from a remote location.

Screen 700 is merely illustrative of screens and methods that may be used to select and display metadata selected advertisements. Any suitable screens and methods of displaying advertisements may be used in accordance with the present invention.

Thus, systems and methods for providing metadata-linked advertisements are provided. Persons skilled in the art will appreciate that the present invention can be practiced by other than the described embodiments, which are presented for purposes of illustration rather than of limitation, and that the present invention is limited only by the claims that follow.

What is claimed is:

1. A method comprising:

retrieving, from a storage device, a media asset and metadata which describes content of a scene of the media asset;

retrieving, from the storage device, a plurality of advertisements and metadata associated with each of the plurality of advertisements that describes content of a respective advertisement;

retrieving metadata which describes at least one predefined selectable target area in the scene of the media asset;

comparing the metadata which describes the content of the scene of the media asset with the metadata associated with each of the plurality of advertisements; and based on the comparison, selecting one of the plurality of advertisements from the storage device for display on a display device associated with a user.

2. The method of claim 1, further comprising:

determining whether the selected advertisement is stored locally;

in response to determining that the selected advertisement is not stored locally, downloading the selected advertisement from a remote location.

3. The method of claim 1, wherein comparing the metadata which describes the content of the scene of the media asset with the metadata associated with each of the plurality of advertisements occurs while the media asset is being displayed.

4. The method of claim 1, wherein comparing the metadata which describes the content of the scene of the media asset with the metadata associated with each of the plurality of advertisements comprises determining whether content of the scene is associated with content of at least one of the plurality of advertisements.

5. The method of claim 1, further comprising generating for simultaneous display the scene of the media asset and the selected advertisement.

6. The method of claim 1, wherein the metadata which describes content of the scene of the media asset describes an object depicted within the scene of the media asset, and wherein the selected advertisement is associated with the object.

7. The method of claim 6, further comprising receiving a user selection of the object depicted within the scene of the media asset.

8. The method of claim 7, wherein the user selection of the object occurs prior to selecting the one of the plurality of advertisements for display.

9. The method of claim 6 further comprising receiving a user input to order the object depicted within the scene of the media asset.

10. The method of claim 1 further comprising storing the plurality of advertisements in local storage.

11. The method of claim 1, wherein comparing the metadata which describes the content of the scene of the media asset with the metadata associated with each of the plurality of advertisements occurs in response to a user selection of an object depicted within the scene of the media asset.

12. The method of claim 1, further comprising:
additionally comparing the metadata which describes the at least one predefined selectable target area in the scene of the media asset; and
wherein the selection of the one of the plurality of advertisements for display is based on the additional comparison.

13. A system comprising:
control circuitry configured to:
retrieve, from a storage device, a media asset and metadata which describes content of a scene of the media asset;
retrieve, from the storage device, a plurality of advertisements and metadata associated with each of the plurality of advertisements that describes content of a respective advertisement;
retrieve metadata which describes at least one predefined selectable target area in the scene of the media asset;
compare the metadata which describes the content of the scene of the media asset with the metadata associated with each of the plurality of advertisements; and
based on the comparison, select one of the plurality of advertisements from the storage device for display on a display device associated with a user.

14. The system of claim 13, wherein the control circuitry is further configured to:
determine whether the selected advertisement is stored locally;
in response to determining that the selected advertisement is not stored locally, download the selected advertisement from a remote location.

15. The system of claim 13, wherein the control circuitry is configured to compare the metadata which describes the content of the scene of the media asset with the metadata associated with each of the plurality of advertisements while the media asset is being displayed.

16. The system of claim 13, wherein the control circuitry is further configured to compare the metadata which describes the content of the scene of the media asset with the metadata associated with each of the plurality of advertisements by determining whether content of the scene is associated with content of at least one of the plurality of advertisements.

17. The system of claim 13, wherein the control circuitry is further configured to generate for simultaneous display the scene of the media asset and the selected advertisement.

18. The system of claim 13, wherein the metadata which describes content of the scene of the media asset describes an object depicted within the scene of the media asset, and wherein the selected advertisement is associated with the object.

19. The system of claim 18, wherein the control circuitry is further configured to receive a user selection of the object depicted within the scene of the media asset.

20. The system of claim 19, wherein the user selection of the object occurs prior to selecting the one of the plurality of advertisements for display.

21. The system of claim 18 wherein the control circuitry is further configured to receive a user input to order the object depicted within the scene of the media asset.

22. The system of claim 13 wherein the control circuitry is further configured to store the plurality of advertisements in local storage.

23. The system of claim 13, wherein the control circuitry is configured to compare the metadata which describes the content of the scene of the media asset with the metadata associated with each of the plurality of advertisements in response to a user selection of an object depicted within the scene of the media asset.

24. The system of claim 13, wherein the control circuitry is further configured to:
additionally compare the metadata which describes the at least one predefined selectable target area in the scene of the media asset; and
select the one of the plurality of advertisements for display based on the additional comparison.

* * * * *

UNITED STATES PATENT AND TRADEMARK OFFICE
CERTIFICATE OF CORRECTION

| | |
|---|---|
| PATENT NO. | : 10,015,562 B2 |
| APPLICATION NO. | : 14/511479 |
| DATED | : July 3, 2018 |
| INVENTOR(S) | : Moore et al. |

It is certified that error appears in the above-identified patent and that said Letters Patent is hereby corrected as shown below:

On the Title Page

Line 11 Item (57) Abstract: Please change "user=s" to --user's--

Signed and Sealed this
Second Day of April, 2019

Andrei Iancu
*Director of the United States Patent and Trademark Office*